US006315825B1

(12) United States Patent
Black

(10) Patent No.: US 6,315,825 B1
(45) Date of Patent: Nov. 13, 2001

(54) COMPOSITION AND PROCESS FOR IMPROVING THE RESISTANCE TO WATER PENETRATION OF CEMENTITIOUS PRODUCTS AND CEMENTITIOUS PRODUCTS MADE THEREWITH

(75) Inventor: Robert H. Black, New Rochelle, NY (US)

(73) Assignee: Great Barrier Technologies, Inc., Chicago, IL (US)

( * ) Notice: Subject to any disclaimer, the term of this patent is extended or adjusted under 35 U.S.C. 154(b) by 0 days.

(21) Appl. No.: 09/455,295

(22) Filed: Dec. 6, 1999

(51) Int. Cl.$^7$ .......................... C04B 24/34; C04B 24/08; C04B 26/22

(52) U.S. Cl. .............. 106/659; 106/2; 106/660; 106/823

(58) Field of Search .................. 106/2, 659, 660, 106/823

(56) References Cited

U.S. PATENT DOCUMENTS

| | | | |
|---|---|---|---|
| 4,094,694 | * 6/1978 | Long ........................................ | 524/5 |
| 4,377,649 | * 3/1983 | Sweeney et al. ...................... | 524/49 |
| 4,475,952 | * 10/1984 | Amara et al. ......................... | 106/659 |
| 4,656,005 | 4/1987 | Arpin ..................................... | 422/43 |
| 4,748,196 | * 5/1988 | Kuroda et al. ......................... | 524/43 |
| 4,878,948 | 11/1989 | Shah ....................................... | 524/4 |
| 5,120,355 | * 6/1992 | Imai ........................................ | 106/2 |
| 5,228,905 | 7/1993 | Grunewalder et al. ................. | 106/2 |
| 5,294,251 | 3/1994 | Urena ..................................... | 106/271 |
| 5,346,943 | 9/1994 | Khungar et al. ....................... | 524/398 |

FOREIGN PATENT DOCUMENTS

93/04007 * 3/1993 (WO) .

* cited by examiner

Primary Examiner—Anthony Green
(74) Attorney, Agent, or Firm—Welsh & Katz, Ltd.

(57) ABSTRACT

A process and compositions for improving the resistance of cementitious products such as concrete, mortar, grout, paving, paving blocks, concrete pipe, concrete blocks, cellular concrete, extruded roof concrete, shot crete and concrete statuary to the penetration of water utilizes a minor amount of aqueous emulsion of rosin or a waxy substance in a major amount of water to form a substantially aqueous mixture utilized as the aqueous ingredient in the preparation of the cementitious product. The composition of an aqueous emulsion of rosin or a waxy substance, water, cement and aggregate provides, in addition to improved resistance to the penetration of water, maintains the strength of the cementitious product and can provide a vehicle for adding property enhancing agents to the cementitious product.

24 Claims, No Drawings

COMPOSITION AND PROCESS FOR IMPROVING THE RESISTANCE TO WATER PENETRATION OF CEMENTITIOUS PRODUCTS AND CEMENTITIOUS PRODUCTS MADE THEREWITH

BACKGROUND OF THE INVENTION

1. Field of the Invention

The present invention relates to cementitious products such as concrete, mortar, grout, and the like, and concrete products such as paving, paving blocks, concrete pipe, concrete blocks, cellular concrete, extruded concrete and roofing material, shot crete and concrete statuary; and more particularly to an improved cementitious composition and process for producing cemetitious products having improved resistance to water penetration and other deleterious elements and agents.

2. Description of Related Art

Concrete is a widely used engineering construction material, generally comprising a cementing or bonding substance, usually cement, and most commonly portland cement; aggregate, such as gravel, stone and/or sand; and water. Other cementitious products, such as mortar or grout are made by varying the type of aggregate employed. The cementing substance, particularly hydraulic cement, usually reacts chemically with water to form a hard, stonelike mass, which during concurrent mixing with aggregate, forms concrete, mortar and other cementitious products.

While cementitious products, such as concrete, particularly as used for pavement, bridges, walls, dams and the like, are relatively durable, they deteriorate over time, often due to the penetration of water into the product, particularly due to the porous nature of the product. Excess water is always used in a concrete mix in order to facilitate pouring and placement of the concrete. If the exact amount of water needed to hydrate the cement is used, the concrete would not be pourable or placeable. The excess water found in the mix is non-compressible and substantially evaporates from the concrete as it cures, and the resultant mass becomes porous as evaporation progresses. The porosity further diminishes the durability of the concrete, providing locations for water to penetrate the concrete. In climates where freezing temperatures periodically occur, the water in the product tends to freeze during such periods, and when frozen expands, often causing cracks, spalling and accellerated disintegration of the product. The deterioration is particularly noticeable where metal is used for reinforcement of the concrete products, for example, in the form of reinforcing mesh or rods, for example "rebars" in concrete pavement and the like. Over time, water penetrates through the concrete which corrodes metal reinforcement, often causing visible stains on the surface of the product, as well as weakening of the structure of the product.

In prior attempts to reduce water penetration, detergents have been mixed into the mixture of water, cementing substance and aggregate, but the result has been only marginally decreasing the porosity of the resulting product. Other known additives such as pozzolanic materials and metal salts of fatty acids provide only marginal improvement in water resistance, and also decrease the strength of the product during curing.

Quality concrete has surfactants added to the mix. Surfactants decrease the need for excess water, while making the concrete mix pourable as if the added amount of excess water was present. The pourability of the concrete mix is referred to as "slump". These surfactants are known as water-reducers, plasticizers and in some cases "superplasticizers". When surfactants are introduced into the concrete, the result is a less porous and somewhat stronger product. The strength increase is attributed to lower water/cement ratio and decrease in porosity. While surfactants improve the resistance to water penetration, surfactants alone provide too little improvement to be considered a solution to the problem.

Another proposal to reduce water penetration has been the introduction into the composition of a glycol ester of a $C_8$–$C_{22}$ fatty acid, such as the polyethyleneglycol ester of stearic acid, as in U.S. Pat. No. 4,878,948. The resulting product provides only incremental improvement in water penetration. Other attempts at reducing water penetration of cementitious products have utilized surface treatments, using such treatments as aqueous dispersions of film forming synthetic polymers and coagulants, film forming water-based, wax-free emulsions of a $C_4$ linear polymer composition used for both wood and concrete surfaces, and paraffin wax in solvent coatings. These surface treatments are impractical with large surfaces, such as pavements, and are ineffective over a period of time due to wear and erosion of the coating due to climatic elements and ultraviolet deterioration.

Therefore, there is a need for compositions and a process for substantially improving the water resistance of cementitious products, which compositions and process do not decrease the strength and other properties of the products.

SUMMARY OF THE INVENTION

Therefore, it is one object of the present invention to provide a composition which substantially improves the resistance of cementitious products to the penetration of water.

It is another object of the present invention to provide a process for the production of cementitious products which have improved resistance to the penetration of water.

It is still another object of the present invention to provide compositions and a process to reduce the amount of water required in the production of cementitious products which have improved resistance to the penetration of water.

Still another object of the present invention is to provide compositions and a process for improving the resistance against mildew on the surface of cementitious products.

Another object of this invention is to provide compositions and a process for improving the flowability of cementitious compositions.

Still another object of the invention is to provide compositions and a process for improving the resistance of cementitious products to the growth of algae on their surface.

Another object of the invention is to provide compositions and a process for improving the resistance of cementitious products containing certain additives to deterioration from ultraviolet radiation of those additives within the products.

Still another object of the invention is to provide compositions and a process for improving the durability of cementitious products against deterioration as a result of cyclical freezing and thawing.

Another object of the present invention is to provide compositions and a process for providing cementitious products having lower weight per volume than cementitious products of the prior art.

It is still another object of this invention to provide compositions and a process which efficiently provide a vehicle for instituting property enhancing agents into cementitious products while improving the resistance of the cementitious products to the penetration and/or absorption of water into the products.

These and other objects and advantages of the present invention will be apparent from the following description.

In accordance with the present invention a process is provided for improving the resistance of a cementitious product to the penetration of water into the product in which a minor amount of an aqueous emulsion of a waxy substance or of rosin is combined with a major amount of water to form a substantially aqueous mixture which is utilized as the aqueous ingredient in the preparation of the cementitious product. For convenience, both rosin and waxy substances useful in the present invention are referred to as "waxy substance", and emulsions of both a waxy substance or of rosin are referred to herein as "emulsion of a waxy substance", unless otherwise described. The composition of the present invention comprises an aqueous mixture including an aqueous emulsion of a waxy substance in an amount sufficient to improve the resistance to the penetration of water in a cementitious product admixed with cement and aggregate.

It is surprising and unexpected that the use of an aqueous emulsion of a waxy substance in the composition of water, cement and aggregate to form the cementitious product provides improved resistance to the penetration of water while substantially maintaining the strength of the product because it has generally been found that previous attempts to introduce wax and wax-like substances into the composition tended to weaken the resulting cementitious product. For example, the introduction of a wax in a solvent into the composition of water, cement, and aggregate used to produce a concrete product caused the resulting concrete product to have substantially less strength than the concrete product produced from a substantially identical composition without the wax. It is believed that the wax coated the aggregate particles and inhibited the adherence of the cement paste to the aggregate particles causing the weakening of the product as measured by testing the compressive strength of the product.

The aqueous emulsion in accordance with the present invention, in addition to an aqueous emulsion of rosin, can be an aqueous emulsion of wax of animal or vegetable origin, or of petroleum origin or similar substances. Waxes suitable for use in the aqueous emulsion of the present invention include: bees wax, Candellia wax, Carbowax, Carnbauba wax, Fisher-Tropsch waxes, Montan wax, Ozocerite, petroleum waxes, including paraffin wax, microcrystalline wax, and their mixtures. Preferably the waxy substance employed in the aqueous emulsion of the present invention is selected from the group consisting of paraffin wax, microcrystalline wax, crystalline or slack wax, and mixtures thereof.

Aqueous emulsions of a waxy substance utilized in the process and composition of the present invention can be prepared by heating the waxy substance to a temperature sufficient to cause the waxy substance to flow, for example by heating the waxy substance above its melting point, and mixing, for example by spinning at a relatively high speed, the waxy substance in its flowable condition with water, and preferably with a surfactant. Aqueous emulsions of wax emulsions are commercially available. One example of a commercially available aqueous emulsion of a microcrystalline wax, i.e., a paraffin emulsion, is marketed by Hercules Incorporated, Wilmington, Del., U.S.A. under the product name MICROLUBE® N Paraffin Wax Emulsion. Another commercially available aqueous emulsion which can be used in the composition and process of the present invention, which is also marketed by Hercules Incorporated, and which is also a paraffin wax emulsion is PARACOL® 802 N Paraffin Emulsion.

Typically these new emulsions are stabilized in an aqueous emulsion with a surfactant such as alkali metal salts of fatty acids, alkali metal salts of sulfated fatty acids, alkali metal alkyl sulfates, alkali metal alkyl sufonates, alkali metal aryl sufonates, alkali metal alkyl lauryl sulfonate, alkali metal salts of alkylated naphthalene, alkali metal salt of lignosulfonic acid, condensation products of ethylene oxide and polyalkylene glycols, fatty acid glycerides, fatty acid amides, polyethylene sorbitol esters of fatty acids, quarternary ammonium halides, sorbitan esters, sulfonated or sulfated fatty acid esters or amides, and sulfonic acid. For example, excellent results have been achieved with sodium lignosulfonate as the surfactant, particularly with slack wax as the waxy substance in the emulsion.

Unexpectedly, very little aqueous emulsion is required to achieve substantial improvement in the resistance of the cementitious product to water penetration while maintaining the strength of the product. It has been found that as little as about 0.25% by weight of waxy substance to the weight of total water used in the water, cement and aggregate mixture provides substantial improvement in the resistance of the product to water penetration, while maintaining the strength of the product, while amounts above about 20% by weight of waxy substance to the weight of water in the mixture provide almost no further improvement in the resistance of the product to water penetration. Preferably the waxy substance in the emulsion constitutes from about 0.35% to about 10% of the water in the mixture noted above, and most preferably from about 0.5% to about 5% of the water in the mixture.

Further, unexpectedly, the addition of the aqueous emulsion of a waxy substance to the water, cement and aggregate mixture permitted a reduction in the amount of water required to form a workable mixture, i.e., the amount required for acceptable "slump", from the amount of water that would otherwise be required by equivalent weight substitution of emulsion for water. This surprising desirous effect advantageously permits greater flexibility in formulating compositions for producing cementitious products, and unexpectedly provides lighter weight products having strength equivalent to the heavier weight mixtures without the additional water.

Another unexpected advantage is that the waxy substance slows the evaporation of the excess water from the concrete as it cures. It commonly takes as long as two weeks for the majority of water to hydrate the cement. Often sheets of plastic or other materials are placed overly fresh poured concrete to slow the evaporation rate of the water internally to the mix. The resulting fully hydrated concrete is stronger than samples that have not been covered with plastic or the other material. It has now been found that the waxy substance in the emulsion in the present invention slows the rate of evaporation of the free water, i.e., the water above the amount required to hydrate the cement. For example, in one case the control sample turned white within two days, whereas the sample with the waxy substance admix remained gray for about five days and the waxy substance emulsion containing sample retained its weight longer than the control sample indicating that the evaporation rate of the emulsion containing sample was desirably substantially reduced.

The composition and process of the present invention further provides an advantageous vehicle for introducing property enhancing agents into cementitious products in addition to improving the resistance of the products to the penetration and/or absorption of water into the products. These agents or additives may be dissolved in the waxy substance upon melting of the latter prior to the formation of the emulsion. If the agent is insoluble in the waxy substance, a co-solvent may be utilized to form a homogenous mixture, after which the latter can be made into the aqueous emulsion, and if desired, a surfactant incorporated. Such property enhancing agents can include mildew reducing agents, algae reducing agents, coloring agents, free radical scavengers, ultraviolet radiation absorption inhibiting agents, light stabilizing agents, corrosion inhibiting agents, and oxidation inhibiting agents, among others.

Among the property enhancing agents which can be successfully incorporated in property enhancing amounts in the compositions, and in accordance with the process of this invention, are: NUOCIDE®1071 Algicide, a non-metallic organic algicide marketed by Hüls America Inc., Somerset, N.J., USA, either alone or with NUOCIDE®404D or NUOCIDE®960, also marketed by Hüls America Inc. (NUOCIDE is a registered trademark of Hüls America Inc.), preferably in a ratio of 0.8% NUOCIDE 440D to 0.1–0.2% NUOCIDE 1071 by weight of the total composition; MERGAL®S90 Algicide marketed by Allied Signal, Inc., Morristown, N.J., USA (MERGAL is a registered trademark of Allied Signal, Inc.); IRGAROL® 1071 Algicide marketed by Ciba Specialty Chemical Corporation, Tarrytown, N.Y., USA (IRGAROL is a registered trademark of Ciba Chemicals Corporation), and is also distributed by Allied Signal, Inc., Huls America, Inc. and Troy Corporation, Florham Park, N.J. USA; TINUVIN®292, TINUVIN®144 and TINUVIN®123 hindered amine light stabilizers, TINUVIN®328, TINUVIN®384, TINUVIN®900, TINUVIN®928, and TINUVIN®1130 hydroxyphenylbenzotriazole ultraviolet light stabilizers, TINUVIN®400 hydroxyphenyltriazine ultraviolet radiation absorber, marketed by Ciba Specialty Chemicals Corporation (TINUVIN is a registered trademark of Ciba Specialty Chemicals Corporation). IRGANOX®1010 and IRGANOX®1076 phenolic antioxidants marketed by Ciba Specialty Chemicals Corporation, (IRGANOX is a registered trademark of Ciba Specialty Chemicals Corporation); IRGANOX®1035 antioxidant and peroxide antidecomposer marketed by Ciba Specialty Chemicals Corporation; IRGANOX®B Blends of antioxidants and phosphite peroxide antidecomposer marketed by Ciga Specialty Chemicals Corporation; IRGACOR®153 C12–14 tert-alkamines compounds with (2-benzothiazolylthio)-butanedocic acid (2:1) xylenes corrosion inhibitor, IRGACOR®252 LD crystalline corrosion inhibitor and IRGACOR®225LD corrosion inhibitor, all marketed by Ciba Specialty Chemicals Corporation, (IRGACOR is a registered trademark of Ciba Specialty Chemicadl Corporation); and sodium nitrite as a corrosion inhibitor.

DESCRIPTION OF THE PREFERRED EMBODIMENTS

As a typical composition in accordance with the present invention, the waxy substance in the aqueous emulsion thereof may constitute approximately 50% of the emulsion, and the amount of emulsion employed calculated to be about 0.5%–20% of waxy substance, for example wax, to the total amount of water in the water, cement and aggregate mixture. In the following example, except for the control which did not contain any aqueous emulsion of a waxy substance, the aqueous emulsion of waxy substance was MICROLUBE® C marketed by Hercules Incorporated, which contained 48% microcrystalline wax.

EXAMPLE 1

Samples of composition in accordance with the process of the present invention and of a control, were prepared by weighing and storing separately under sealed conditions, portions of 375 grams of cement, and 675 grams of sand which had been oven dried to remove moisture. The amount of water needed to obtain a flowable composition, i.e., a composition which is workable for molding, troweling or paving purposes was determined by placing a 375 gram portion of cement and a 675 gram portion of dried sand in a mixing bowl, and adding thereto and mixing water until a dry mixture having the consistency of mortar was obtained. The amount of water required was 180 grams. Mixing of the mixture was continued for approximately 3–4 minutes until the mixture was uniform in consistency. Samples containing 5%, 10%, 15% and 20% wax as described above of the total amount of water in the composition, via the aqueous wax emulsion, were prepared by substituting an appropriate amount of emulsion, i.e., the amount of water in the emulsion, for the equivalent amount of the 180 grams of the water in the mixture to maintain the same water to cement ratio in the mixture. Thus, the following samples, including the control noted above, using the above noted amounts of cement and sand, with all ingredients stated in grams, were prepared using the above procedure:

TABLE 1

Composition of Samples

| Sample | Aqueous emulsion* | water |
| --- | --- | --- |
| Controls | 0 | 180 |
| S-5 | 18.75 | 170.25 |
| S-10 | 37.5 | 161 |
| S-15 | 56.25 | 150.75 |
| S-20 | 75 | 141 |

*As described above. The amount of emulsion was calculated by determining the amount of wax to water required, e.g., 5% of 180 g = 9 g wax, times the amount of solids in the emulsion, e.g., 48%, to calculate amount of emulsion, e.q., 18.75 grams, and the amount of water to be deducted from 180 grams, i.e., 9.75 g (18.75 g) in sample S-5.

The samples noted above were placed into polypropylene tubes, and rodded and tamped successively 20 times, filled over the top of the tubes and again rodded to form a compact sample. Excess material was removed from the top of the tubes with a screed.

The addition of the emulsion, in all of the composition samples containing the aqueous emulsion of a waxy substance, caused the composition of emulsion, water, cement and sand to be substantially "looser", i.e., more flowable than usually desired, compared to the controls without emulsion. The looser (increased slump) condition of the emulsion containing mixtures indicated that the amount of water required is less than the amount expected from the calculated substitution of the water in the emulsion for an equivalent amount of the water required for the non-emulsion containing controls to achieve the same slump.

Improvement in the resistance to water penetration of the product of the tamped and rodded samples of the compositions in Example 1 was first determined by observing the rising of wax from the emulsion to the surface of the samples S5–S20. Next, after the samples were allowed to cure for 8 days. Upon stripping of the emulsion-containing samples from the polypropylene tubes, it was noted that no loss of adhesion was apparent, indicating that the presence of the emulsion had no adverse effect on the adhesive properties of the product. A preliminary water penetration test was performed by placing a drop of water on top of each of the control samples, which was immediately absorbed, whereas a drop placed on the 5% emulsion-containing samples S-5 remained on top of the samples for one-half hour when the test ended. A similar test was conducted on the bottom of the samples. Two drops of water on the control samples were absorbed within 52 minutes, whereas the water drops never fully penetrated the bottom surface of the emulsion-containing samples.

Measurements of properties as noted below were obtained by an independent testing laboratory. Presented below are the results of water permeability tests for 7 days, unit weight and water absorption tests over 24 hours, and compressive strength tests after 28 days:

TABLE 2

Water Permeability
ASTM-D5084 Procedure

| Sample | Water Penetration (cm/sec) |
| --- | --- |
| Control | $1.5 \times 10^{-8}$ |
| S-5 | $1.0 \times 10^{-10}$ |
| S-10 | $<1.0 \times 10^{-10}$ |
| S-15 | $<1.0 \times 10^{-10}$ |
| S-20 | $<1.0 \times 10^{-10}$ |

TABLE 3

Unit Weight & Water Absorption
ASTM-C642 Procedure

| Sample | Unit Weight (lbs./w. ft.) | Water Absorption, % 24 hour soak |
| --- | --- | --- |
| Control | 136.9 | 2.60 |
| S-5 | 133.3 | 2.41 |
| S-10 | 131.8 | 2.10 |
| S-15 | 131.3 | 1.90 |
| S-20 | 130.6 | 1.48 |

TABLE 4

Compressive Strength
ASTM-C39 Procedure

| 2 samples each | psi |
| --- | --- |
| Control | 4201, 4456 |
| S-5 | 3660, 5172 |
| S-10 | 3380, 4424 |
| S-15 | 3596, 4497 |
| S-20 | 5283, 3868 |

The emulsion containing samples were cut with a diamond saw, polished, and were studied under magnification to determine the homogeneity of the emulsified wax particles in the samples. It was found that the particles had relatively uniform distribution in the admixture. It was also observed that the entrapped voids were non-uniform in size, but uniformly distributed in the samples.

EXAMPLE 2

In this example a lower amount of emulsion of a waxy substance, namely 2.5% waxy substance by weight of the total water in the composition, was utilized and compared to control samples and the composition of S-5 in Example 1, using the preparation procedures of that example. The samples utilized 375 grams of portland cement and 675 grams of sand and the following in grams:

TABLE 5

Composition of Samples

| Sample | Aqueous emulsion* | Water |
| --- | --- | --- |
| Controls | 0 | 180 |
| S-2.5 | 9.38 | 173 |
| S-5/2 | 18.75 | 166 |

*As in Example 1.

The samples following mixing and placing in polypropylene tubes were tamped and rodded as in Example 1, and tested for compression, unit weight, and water permeability with the following results;

TABLE 6

Compressive Strength
ASTM - C39 Procedure

| Sample | Aged (days) | Compression (psi) |
| --- | --- | --- |
| Control 1A | 7 | 4395 |
| Control 1B | 14 | 5481 |
| S-2.5 | 7 | 4496 |
| S-2.5 | 14 | 5610 |
| S-5/2 | 7 | 4415 |
| S-5/2 | 14 | 5593 |

TABLE 7

Unit Weight
ASTM - C642 Procedure

| Sample | Weight (lbs/cu. ft.) |
| --- | --- |
| Control 1A | 137.2 |
| Control 1B | 139.0 |
| S-2.5 | 134.4 |
| S-2.5 | 134.2 |
| S-5/2 | 131.8 |
| S-5/2 | 131.9 |

TABLE 8

Water Penetration
ASTM-D5084 Procedure

| Sample | Water Permeability (cm/sec) |
| --- | --- |
| Control | $1.28 \times 10^{-8}$ |
| S-2.5 | $0.75 \times 10^{-10}$ |
| S-5/2 | $0.72 \times 10^{-10}$ |

The above tests demonstrated that the strengths of the samples containing aqueous emulsions of a waxy substance were slightly higher than the control samples without the waxy substance, that the unit weights of the emulsion containing samples were lower than the unit weight of the control samples, and that the water permeability of the emulsion containing samples, whether containing 2.5% waxy substance or 5.0% waxy substance, was substantially identical and substantially improved over the permeability of the control sample not containing aqueous emulsion of a waxy substance.

EXAMPLE 3

The amount of water required in a water, cement and aggregate composition can be decreased by utilizing an aqueous emulsion of a waxy substance to a greater extent than might be expected from a substitution of the water content in the emulsion for an equivalent amount of water as present the composition not having the emulsion. To demonstrate this discovery, samples were prepared using the procedures and the composition and amounts of water, cement and sand specified for the control samples in Example 1, and samples (S-5/3) of a 5% waxy substance in aqueous emulsion as described in Example 1 to water (assuming 180 grams of water) using only 166.3 grams of water rather than 170.25 grams as in Samples S-5 in Example 1, and having the same consistency (slump) as the control samples. The samples (2 each) were tested for compressive strength with the following results:

TABLE 9

| Samples | Aged (days) | Compressive Strength ASTM - C39 Compression (psi) |
| --- | --- | --- |
| Controls | 5 | 4456, 3978 |
| S-5/3 | 5 | 4360, 4806 |

Thus, the water content was reduced by 7.6% by using an aqueous emulsion of a waxy substance, while the same workable composition, i.e., having the same slump, was achieved and the average compressive strength of the cementritious product was maintained. Even greater reduction in the water to cement ratio can be obtained with other surfactant systems. For example, use of PARACOL 802N emulsion enabled a reduction in the water to cement ratio by 16.8%. It is known to those skilled in the art that the lower the water to cement ratio, the better the stronger and less porous concrete product.

EXAMPLE 4

The improvement in the ability of the composition of the present invention to withstand alternate periods of freezing and thawing cycle was demonstrated as noted below. Samples of concrete were prepared according to the procedure of Example 1, with the samples each containing 375 grams of cement and 675 grams of sand, and the following in grams:

TABLE 10

| Sample | Composition of Samples Aqueous emulsion* | Water |
| --- | --- | --- |
| Controls | 0 | 180 |
| S-5/4 | 18.75 | 166.3 |

*As in Example 1

The slump of both the control and S-5/4 samples was approximately the same. The samples were placed in polypropylene tubes and rodded and tamped and excess material removed from the top of the tube with a screed as in Example 1. The relative durability of the concrete samples was determined by allowing the specimens to cure for at least two weeks to insure full hydration, and then determining their weight loss following cycles of freezing and thawing. This was accomplished by submerging the samples in a 10% solution of salt water for one day, removing the samples, toweling the samples dry, obtaining their initial weight, placing them in a freezer until completely frozen, and then allowing them to thaw. The freezing and thawing cycles were repeated and the weight of each sample determined after every 5 cycles. The results of the test are as follows, with the weight measured in grams:

TABLE II

| | | Freeze-Thaw Cycles | | | | |
| --- | --- | --- | --- | --- | --- | --- |
| | | | Weight After | | | |
| Sample | Initial Weight | 5 Cycles | 10 Cycles | 15 Cycles | 20 Cycles | 25 Cycles |
| Control | 312.0 | 313.7 | 313.2 | 313.5 | 313.3 | 309.5 |
| S-5/4 | 299.3 | 300.5 | 301.1 | 301.5 | 302.0 | 302.6 |

It was observed that the control sample visibly lost material after only 6 cycles and lost measurable weight after 10 cycles, whereas the emulsion-containing sample gained weight after each cycle and did not show any difference in appearance after each cycle. In addition, the control sample was aged longer than the S-5/4 sample, which should have made the control sample more durable, which it was not. The presence of the aqueous emulsion of a waxy substance in the composition of the present invention substantially improved the product against the deterioration expected to be caused by freezing and thawing as occurred in the control sample. Such unexpected improvement is believed to be due to the substantial improved ability of the emulsion-containing product to withstand water penetration, or to the particles of the waxy substance acting in the same manner that microscopic air particles enhance freeze-thaw durability by allowing water reduction and acting as "shock absorbers".

The slight increase in weight of the S-5/4 sample was unexpected. A possible explanation is that the wax radically decreased the water penetration, and, as time elapsed, a small amount of water penetrated the sample causing a slight increase in its weight. However, there was no evidence of spalling in the sample, whereas significant spalling occured in the control sample.

The significant improvement in the freeze-thaw durability of the products and composition of the present invention was unexpected in view of studies published by the Portland Cement Association which in part states that concrete experiences less deterioration when the water to cement ratio of less than 0.50. Water entering the concrete freezes and expands and deteriorates the concrete. While both the control samples and the emulsion-containing samples each had a water-cement ratio of less than 0.5, the control sample deteriorated during freezing and thawing, while the emulsion-containing sample did not. The fact of the lack of deterioration of the emulsion-containing sample could only be explained by the presence of the waxy substance.

EXAMPLE 5

In this example, an aqueous emulsion of a slack wax was utilized to demonstrate the substantial improvement in the resistance against water penetration achieved by the use of aqueous emulsions of other waxy substances in the process and compositions of the present invention. In addition, two different surfactants were present in the emulsions demonstrating the favorable results achieved with each. Samples of concrete were prepared as in Example 1, each containing 375 grams of cement and 675 grams of sand of coarser particles than in Example 1. In addition, the samples contained the following ingredients in grams:

TABLE 12

Composition of Samples

| Sample | Aqueous Emulsion | Water |
|---|---|---|
| Controls 1–3 | 0 | 180 |
| S-5N-1-3 | 18.75 grams* | 170.25 |
| S-5M-1-3 | 18.75 grams** | 170.25 |

\* PARACOL ®802N wax emulsion marketed by Hercules, Incorporated.
\*\* MICROLUBE ®N marketed by Hercules, Incorporated.

It was observed that the Samples S-5N were very sloppy such that no tamping or tapping was necessary to fill the propylene tube since the composition easily flowed, whereas the Samples S-5M were less flowable than Samples 5N. The samples cured for two weeks, and then tested for water absorption, unit weight and compressive strength following the procedure of Example 1, with the following results:

TABLE 13

Water Absorption ASTM-C642

| Sample | Water Absorption, % water absorbed, 24 hour soak |
|---|---|
| Control-1 | 2.45 |
| Control-2 | 2.29 |
| Control-3 | 2.60 |
| S-5N-1 | 1.78 |
| S-5N-2 | 1.86 |
| S-5N-3 | 1.59 |
| S-5M-1 | 1.37 |
| S-5M-2 | 1.58 |
| S-5M-3 | 1.64 |

TABLE 14

Unit Weight ASTM-C642

| Sample | Unit Weight, Grams |
|---|---|
| Control-1 | 136.7 |
| Control-2 | 136.2 |
| Control-3 | 136.3 |
| S-5N-1 | 135.8 |
| S-5N-2 | 135.9 |
| S-5N-3 | 135.2 |
| S-5M-1 | 132.8 |
| S-5M-2 | 132.7 |
| S-5M-3 | 132.9 |

TABLE 15

Compressive Strength ASTM-C39

| Sample | Compressive Strength, psi |
|---|---|
| Control-1 | 4361 |
| Control-2 | 3629 |
| S-5N-1 | 4138 |
| S-5N-2 | 3788 |
| S-5M-1 | 3692 |
| S-5M-2 | 4392 |

One specimen from each of the S-5N samples and the S-5M samples were viewed under magnification, and the wax particles were found to be well distributed in each case. In addition, when a drop of water was placed onto the surface of the S-5N and S-5M samples, the water remained on the surface until it evaporated, and thus was found not to be absorbed into the sample. It was noted that the control sample turned white and lost weight faster than the S-5N and S-5M samples. This unexpected occurrence could be explained by the waxes slowing the rate of evaporation of the excess water found inside the concrete masses. It is believed that these crystalline or slack wax-containing samples retained excess water, whereas excess water evaporated from the control samples, and consequently the necessity to cover freshly placed concrete pavement which is produced in accordance with the present invention with tarpaulins, watered salt grass, or other water-retaining aids to retard the evaporation of water may be eliminated.

EXAMPLE 6

Several different combinations of aqueous emulsions of waxy substances and surfactants were incorporated into compositions in accordance with the present invention and several properties tested. Samples were prepared in the same manner following the same procedures, and with the same amount of cement and sand as in Example 1, and except for the control sample, 18.75 grams of aqueous emulsion of a waxy substance identified as follows:

TABLE 16

Emulsion in Composition

| Sample | Aqueous Emulsion |
|---|---|
| S-6MB | Microcrystalline wax, (MICROLUBE-B) |
| S-6N | Crystalline or slack wax, (MICROLUBE ®N) |
| S-6M | Crystalline or slack wax, (MICROLUBE ®N) (PARACOL 802N) |

The samples were prepared and treated as in Example 1, and properties tested as in that example with the following results.

TABLE 17

Water Permeability

| Sample | Water Penetration (cm/sec) |
|---|---|
| Control | $1.28 \times 10^{-8}$ |
| S-6MB | $1.28 \times 10^{-10}$ |
| S-6N | $6.34 \times 10^{-10}$ |
| S-6M | $6.34 \times 10^{-10}$ |

The results indicate the substantial improvement in the resistance to water penetration provided by the composition of the present invention, with little difference between the waxy substance employed in the emulsion or surfactant used.

TABLE 18

Compressive Strength ASTM-C39

| Sample | Age of Sample, days | Compressive Strength (psi) |
|---|---|---|
| Control | 28 | 4329 |
| S-6MB | 28 | 4416 |

TABLE 18-continued

Compressive Strength
ASTM-C39

| Sample | Age of Sample, days | Compressive Strength (psi) |
|---|---|---|
| S-6N | 1.28 | 3963 |
| S-6M | 1.28 | 4043 |
| S-6N* | 28 | 5368 |

*reduction in water by 16.8%.

These results demonstrate the maintenance of strength of products prepared from compositions of the present invention.

EXAMPLE 7

In this example still lower amounts of emulsion of a waxy substance were utilized to demonstrate the small amount of emulsion which may be employed in accordance with the present invention to achieve the desired results described herein. In this example, as little as 0.5% and 1% waxy substance by weight of the total water in the composition, were utilized and compared to control samples and samples with 2.5% waxy substance of the compositions of Example 1 and 16 ounces and 32 ounces per 100 pounds of cement of calcium stearate suspension, using the procedures of Example 1. The calcium stearate suspension utilized was Dry Block® marketed by W. R. Grace & Co., and obtained from a local masonry block outlet. The samples utilized 375 grams of portland cement and 675 grams of sand, 180 grams of water in the control samples, and only enough water in the other samples to achieve the same slump as in the control sample. The water to cement ratio of all samples was kept the same, i.e., 0.48 lbs./lb.

The samples following mixing and placing in polypropylene tubes were tamped and rodded as in Example 1, aged 28 days, and tested for compression, unit weight, and water permeability by an independent laboratory with the following results:

TABLE 19

Compressive Strenqth
ASTM - C39 Procedure

| Sample | Compression (psi) |
|---|---|
| Control | 4385 |
| 0.5% W* | 4492 |
| 1.0% W* | 4540 |
| 2.5% W* | 4515 |
| 16 oz. CS** | 4496 |
| 32 oz. CS** | 4520 |

*Waxy substance sample
**Calcium stearate sample

TABLE 20

Unit Weight
ASTM - C642 Procedure

| Sample | Weiqht (lbs/cu. ft.)*** |
|---|---|
| Control | 136.7 |
| 0.5% W* | 136.4 |
| 1.0% W* | 136.0 |
| 2.5% W* | 134.1 |

TABLE 20-continued

Unit Weight
ASTM - C642 Procedure

| Sample | Weiqht (lbs/cu. ft.)*** |
|---|---|
| 16 oz. CS** | 136.1 |
| 32 oz. CS** | 135.8 |

*Waxy substance sample
**Calcium stearate sample
***Average of replicates

TABLE 21

Water Penetration
ASTM-D5084 Procedure

| Sample | Water Permeability (cm/sec) |
|---|---|
| Control | $1.1 \times 10^{-8}$ |
| 0.5% W* | $6.7 \times 10^{-9}$ |
| 1.0% W* | $4.5 \times 10^{-10}$ |
| 2.5% W* | $5.9 \times 10^{-10}$ |
| 16 oz. CS** | $6.5 \times 10^{-9}$ |
| 32 oz. CS** | $5.2 \times 10^{-10}$ |

*Waxy substance sample
**Calcium stearate sample

The above tests demonstrated that the compressive strengths of the samples containing aqueous emulsions of a waxy substance and of solutions of calcium stearate were similar to the strength of the control samples, that there was only a slight reduction in the unit weights of the waxy substance emulsion containing samples and the calcium stearates containing samples as compared to the unit weight of the control samples, and that the water permeability of the waxy substance emulsion containing samples and the calcium stearate containing samples were slower than the water permeability of the control samples. It is noted that the water permeability of the 0.5% waxy substance containing sample and of the 16 ounce calcium stearate containing samples were approximately equal, the permeability of the 32 ounce calcium stearate containing sample was approximately equal to that of the 5% waxy substance emulsion containing sample, and that the resistance to permeability of all of the treated samples were better by a factor of 10 than that of the control sample.

While particular embodiments of the process and compositions of the invention have been described, it will be appreciated by those skilled in the art that changes and modifications may be made thereto without departing from the invention in its broader aspects and as set forth in the following claims.

What is claimed is:

1. A process for improving the resistance to the penetration and absorption of water of a cement aggregate product, comprising:
   combining a minor amount of an aqueous emulsion of rosin or wax, with a major amount of water to form a substantially aqueous mixture, and
   utilizing said substantially aqueous mixture as an aqueous ingredient in the preparation of the cement aggregate product.

2. The process of claim 1, wherein the rosin or the wax comprises at least about 0.25 percent by weight of the total amount of water in the aqueous mixture.

3. The process of claim 1, wherein the aqueous emulsion is an aqueous emulsion of a wax selected from the group consisting of paraffin wax, microcrystalline wax, slack wax and mixtures thereof.

4. The process of claim 3, wherein the aqueous emulsion of a wax comprises at least one microcrystalline wax; a minor amount of surfactant compatible with cement, aggregate and water mixtures; and water.

5. The process of claim 3, wherein the aqueous emulsion of a wax comprises at least one slack wax; a minor amount of a surfactant compatible with cement; aggregate and water mixtures; and water.

6. The process of claim 2, wherein the aqueous emulsion further comprises a minor amount of surfactant compatible with mixtures of cement, aggregate and water.

7. The process of claim 6, wherein the surfactant is a sodium lignosulfonate surfactant.

8. The process of claim 6, wherein the aqueous emulsion further comprises a minor amount of an ultraviolet radiation absorption agent for cement aggregate products.

9. The process of claim 2, wherein the aqueous emulsion further comprises a minor amount of a coloring agent for cement aggregate products.

10. The process of claim 2, wherein the aqueous emulsion further comprises a minor amount of an ultraviolet stabilizer for cement aggregate products.

11. A cementitious composition for use in the preparation of a cementitious product having improved resistance to water penetration and absorption comprising:

a minor amount of a mixture composed of an aqueous emulsion of rosin or wax in an amount sufficient to improve the resistance to water penetration and absorption of the cementitious product;

a major amount of water;

cement; and aggregate.

12. The cementitious composition of claim 11, wherein the rosin or the wax comprises at least about 0.25 percent of the total amount of water in the composition.

13. The cementitious composition of claim 12, wherein the aqueous emulsion is an aqueous emulsion of wax selected from the group consisting of paraffin wax, microcrystalline wax, slack wax and mixtures thereof.

14. The cementitious composition of claim 13, wherein the aqueous emulsion of wax comprises at least one microcrystalline wax; a minor amount of a surfactant compatible with cement, aggregate and water mixtures; and water.

15. The cementitious composition of claim 13, wherein the aqueous emulsion of wax comprises at least one slack wax; a minor amount of a surfactant compatible with cement, aggregate and water mixtures; and water.

16. The cementitious composition of claim 12, wherein the aqueous emulsion of a wax further comprises a surfactant compatible with mixtures of cement, aggregate and water.

17. The cementitious composition of claim 16, wherein the surfactant is a sodium lignosulfonate surfactant.

18. The cementitious composition of claim 12, wherein the aqueous emulsion further comprises a minor amount of an ultraviolet radiation absorption agent for the cementitious product.

19. The cementitious composition of claim 12, wherein the aqueous emulsion further comprises a minor amount of a coloring agent for cementitious products.

20. In a cementitious composition comprising cement, aggregate and an aqueous component for the production of a cementitious product, the improvement comprising:

the aqueous component composed of an aqueous emulsion of rosin or wax in an amount sufficient to improve the resistance of the cementitious product to water penetration and absorption, surfactant compatible with cement, aggregate and water mixtures, and water.

21. The cementitious composition of claim 20, wherein the rosin or the wax comprises at least about 0.25 percent of the total amount of water in the composition.

22. The cementitious composition of claim 20, wherein the aqueous emulsion is an aqueous emulsion of wax selected from the group consisting of paraffin wax, microcrystalline wax, slack wax and mixtures thereof.

23. The cementitious composition of claim 22, wherein the aqueous emulsion of wax comprises at least one microcrystalline wax; a minor amount of a surfactant compatible with cement, aggregate and water mixtures; and water.

24. The cementitious composition of claim 22, wherein the aqueous emulsion of wax comprises at least one slack wax; a minor amount of a surfactant compatible with cement, aggregate and water mixtures; and water.

* * * * *

UNITED STATES PATENT AND TRADEMARK OFFICE
CERTIFICATE OF CORRECTION

PATENT NO. : 6,315,825 B1
DATED : November 13, 2001
INVENTOR(S) : Black

It is certified that error appears in the above-identified patent and that said Letters Patent is hereby corrected as shown below:

Column 5,
Line 49, "Ciga" should be -- Ciba --.
Line 56, "Chemicadl" should be -- Chemical --.

Column 9,
Line 31, a comma should follow the word "achieved".

Column 10,
Line 7, "TABLE II" should be -- TABLE 11 --.

Column 11,
Line 14, "propylene" should be -- polypropylene --.

Column 13,
Lines 8 and 9, "1.28" in both instances should be -- <28 --
Line 27, "1 and 16 ounces" should be -- 1, and with 16 ounces --.

Column 15,
Line 3, the semicolon after "cement" should be a comma.

Signed and Sealed this

First Day of October, 2002

Attest:

JAMES E. ROGAN
Attesting Officer     Director of the United States Patent and Trademark Office